(12) United States Patent
Hayes

(10) Patent No.: US 6,973,496 B2
(45) Date of Patent: Dec. 6, 2005

(54) CONCEALING A NETWORK CONNECTED DEVICE

(75) Inventor: John W. Hayes, Los Gatos, CA (US)

(73) Assignee: Archduke Holdings, Inc., Reno, NV (US)

( * ) Notice: Subject to any disclaimer, the term of this patent is extended or adjusted under 35 U.S.C. 154(b) by 789 days.

(21) Appl. No.: 10/094,425

(22) Filed: Mar. 5, 2002

(65) Prior Publication Data
US 2004/0215771 A1 Oct. 28, 2004

(51) Int. Cl.⁷ .............................................. G06F 15/16
(52) U.S. Cl. ....................... 709/227; 713/151; 713/171
(58) Field of Search ........................ 709/225, 227–229; 711/164; 713/150, 171, 176, 186; 380/278–285

(56) References Cited

U.S. PATENT DOCUMENTS

| | | | | |
|---|---|---|---|---|
| 5,835,726 A | * | 11/1998 | Shwed et al. ................ | 709/229 |
| 5,941,988 A | * | 8/1999 | Bhagwat et al. ............. | 713/201 |
| 5,958,053 A | * | 9/1999 | Denker ........................ | 713/201 |
| 5,978,849 A | * | 11/1999 | Khanna ....................... | 709/227 |
| 6,061,341 A | * | 5/2000 | Andersson et al. .......... | 370/338 |
| 6,115,393 A | * | 9/2000 | Engel et al. ................. | 370/469 |
| 6,182,226 B1 | * | 1/2001 | Reid et al. ................... | 713/201 |
| 6,247,060 B1 | * | 6/2001 | Boucher et al. ............. | 709/238 |
| 6,327,626 B1 | * | 12/2001 | Schroeder et al. ........... | 709/236 |
| 6,341,129 B1 | * | 1/2002 | Schroeder et al. ........... | 370/354 |
| 6,564,267 B1 | * | 5/2003 | Lindsay ....................... | 709/250 |
| 6,570,849 B1 | * | 5/2003 | Skemer et al. ............ | 370/230.1 |
| 6,625,657 B1 | * | 9/2003 | Bullard ........................ | 709/237 |
| 6,826,684 B1 | * | 11/2004 | Fink et al. ................... | 713/160 |
| 2001/0009014 A1 | * | 7/2001 | Savage et al. ............... | 709/204 |
| 2001/0034847 A1 | * | 10/2001 | Gaul, Jr. ...................... | 713/201 |
| 2001/0042200 A1 | * | 11/2001 | Lamberton et al. .......... | 713/151 |
| 2001/0047474 A1 | * | 11/2001 | Takagi et al. ................ | 713/151 |
| 2002/0035681 A1 | * | 3/2002 | Maturana et al. ............ | 713/151 |

FOREIGN PATENT DOCUMENTS

WO WO 99/31855 * 6/1999 ........... H04L 29/06

OTHER PUBLICATIONS

Thomas, Michael; "Bindling Updates Security"; community.roxen.com; draft-thomas-mobileip-bu-sec-00.txt; Cisco Systems, Nov. 2, 2001.*
Bellovin, Steven M.; "Probable Plaintext Cryptanalysis of IPSEC"; AT&T Labs Research, Feb. 2, 1997; pp. 1-11.*

(Continued)

Primary Examiner—Beatriz Prieto
Assistant Examiner—Michael D. Meucci
(74) Attorney, Agent, or Firm—Thomas N. Giaccherini

(57) ABSTRACT

In a preferred embodiment of the invention, a network client inserts a validation key into the SEQ and ACK fields of a TCP connection request (TCP-SYN). The TCP connection request is sent to a validating server. The validating server extracts the validation key and uses it, with other implicit and explicit data contained within the TCP connection request to validate the connection establishment request. If the connection request is validated, the validating server responds with a TCP-SYN/ACK as described in the TCP protocol specification. If the TCP connection request is denied, the request is discarded and nothing is sent back to the requestor, in this case the network client. When an internet port scanner sends a TCP connection request to a validating network server without the proper key, the request is silently discarded or "black-holed." This makes the validating server appear to the Internet port scanner to not exist. The validating server has completely concealed itself from unauthorized and unvalidated connections.

1 Claim, 3 Drawing Sheets

OTHER PUBLICATIONS

Stevens, W. Richard; (TCP/IP Illustrated: the protocols, vol. 1): Addison Wesley, 1994; pp. 225-227.*

RFC 793, "RFC 793: Transmission Control Protocol"; DARPA Internet Program Protocol Specification; Information Sciences Institute, University of Souther California; Sep. 1981; pp. 1-85.*

Kent et al.; "RFC 2406: IP Encapsulating Security Payload (ESP)"; Network Working Group; Nov. 1998; pp. 1-22.*

Thayer et al.; "RFC 2411: IP Security Document Roadmap"; Network Working Group; Nov. 1998; pp. 1-11.*

* cited by examiner

Figure 1

IP Header

| Version | IHL | Type of Service | Total Length | |
|---|---|---|---|---|
| Identification | | | Flags | Fragment Offset |
| Time to Live | | Protocol | Header Checksum | |
| Source Address (SA) | | | | |
| Destination Address (DA) | | | | |

Figure 2

TCP Header

| Source Port (SP) | | Destination Port (DP) | |
|---|---|---|---|
| Sequence Number (SEQ) | | | |
| Acknowledgement Number (ACK) | | | |
| Data Offset | Reserved | Flags | Window |
| Checksum | | Urgent Pointer | |

TCP Connection Establishment Transaction

CONCEALING A NETWORK CONNECTED DEVICE

INTRODUCTION

The title of this Patent Application is Concealing a Network Connected Device. The Applicant, John William Hayes, of 24700 Skyland Road, Los Gatos, Calif. 95033, is a citizen of the United States of America.

FEDERALLY SPONSORED RESEARCH OR DEVELOPMENT

None.

FIELD OF THE INVENTION

The present invention pertains to methods for concealing the existence of a device connected to a computer network or concealing the existence of certain applications running on a device connected to a computer network. Many computer security attacks are prefaced by a series of probes designed to detect what the network ports and addresses are on the devices that are connected to a computer network. If a device connected to a computer network is concealed in such a way that it cannot be detected by a network scan, an unvalidated user or other similar applications, then the presence of the network connected device cannot be learned by probing the computer network. This loss of the ability to gain information by probing a computer network should lead to increased security of computer networks. The present invention is envisioned to work in conjunction with firewalls and other computer network and security equipment.

BACKGROUND OF THE INVENTION

Since the advent of the ARPANET and then the Internet, more and more computers and other devices have been connected to a TCP/IP based network. As the Internet has grown, so have the attacks of hackers and others who try to disrupt the network through DOS and DDOS attacks, or who attempt to gain unauthorized access to computers and devices.

The first internet attached devices conformed to the original TCP/IP protocol specifications. When a TCP connection request (otherwise known as a TCP-SYN) was received on a TCP port that no application was listening to, the receiving device would send a connection reject message back to the TCP connection initiator. Hackers quickly learned that they could build port scanners that would scan the entire range of ports on an IP address and learn from the list of successful connection attempts and rejected attempts, what applications were running on the device having the scanned IP address. Over time, network device profile databases were developed that could determine the underlying operating system, vendor and patch level based upon the responses from scanned device.

To combat this, many computer and internet device vendors changed the behavior of network connected machines that receive connection requests on TCP ports that do not have an associated listening application. The new behavior discards the TCP connection request, without sending a connection reject message to the connection request originator. This behavior is known as "black-holing." This behavior helps because instead of getting a distinct positive or negative acknowledgment, the scanning device must decide how long to wait before timing out the connection request. Because the scanner must also take into account network congestion and other network delays, this timeout is usually on the order of seconds. Timing out each request takes more time and causes the scans to take much longer. Although this does prevent a scanning device from learning what is not there, it will still receive a positive acknowledgment in the form of a connection establishment for those TCP ports that have an application bound to them.

There are mechanisms that can validate incoming TCP connection requests based on the requestor's IP address. This approach fails in two ways; first it does not work with dynamically allocated IP addresses, such as those that are used in most dial up modem pools, because all of the IP addresses in the pool must be considered valid addresses for this to work. This approach also fails when the requester lies behind a network address translation (NAT) device, because this changes the requestor's IP address.

None of the above solutions provides a mechanism to validate the requestor solely on the received TCP connection request without relying on the requestor's IP address. The development of such a mechanism would constitute a major technological advance, and would satisfy long felt needs and aspirations in the computer networking and internet industries.

SUMMARY OF THE INVENTION

The present invention enables a network connected device to validate a requester based on the received TCP connection request without relying solely on a requestor's IP address. If the validation is successful, then the connection is established. If the validation fails, the request is "black-holed," even though there is an application bound to the TCP port in the connection request.

The validation mechanism uses a combination of various fields in the IP and TCP headers in the TCP connection request. All of these fields have a primary function that is defined in the IP and TCP specifications. The goal of this present invention is to enable an validation mechanism that can function using only the fields in the IP and TCP headers that are normally present in the TCP connection establishment request. This mechanism must not define any new or additional fields and must preserve the functionality of the fields already present. Specifically, the validation mechanism must encode itself within the fields that are already present without affecting their function. This mechanism must also not require the use of any optional fields that may not be supported by all networking equipment.

Within the IP and TCP headers there are fields that have strictly defined meanings that do not allow any additional encoding because this would alter the functionality of the IP and/or TCP protocols. Examples of such fields are the Source Address, Destination Address, Checksum, Source Port and Destination Port fields.

Within the TCP header, on a connection request (TCP-SYN), the Sequence Number (SEQ) field specifies the starting sequence number for which subsequent data octets are numbered. Additional TCP specifications recommend that this number be randomly generated. This field is 32 bits long. Also within the TCP header is the Acknowledgment Number (ACK) field. This field is not used on a TCP-SYN. This field is 32 bits long and is adjacent to the SEQ field. This gives us 64 bits of data to use as a validating key. The key exchange mechanism is outside the scope of this invention.

The initiator obtains a validation key through an external mechanism. The initiator then sends a TCP connection attempt, placing the 64 bit validation key in the SEQ and ACK fields, to the desired network connected device. The device, upon receiving the connection request, looks up the received validation key. The receiving device may also use the requestor's IP address, the time of day or date that the request was received, the physical port the request was received on, or any other information, implicitly or explicitly carried with the TCP connection request to determine the validity of the connection request. If the connection request, the enclosed validation key and all additional connection granting criteria are met, then the receiving network device validates the request and continues the connection establishment transaction by sending a TCP-SYN/ACK in accordance to the TCP protocol specification. If the connection request, the enclosed validation key and all additional connection validation criteria are not met, then the receiving network device discards the request and nothing is sent to the connection requestor.

An appreciation of the other aims and objectives of the present invention and a more complete and comprehensive understanding of this invention may be obtained by studying the following description of a preferred embodiment, and by referring to the accompanying drawings.

A BRIEF DESCRIPTION OF THE DRAWINGS

FIG. 1 is an illustration which shows Internet Protocol (IP) header.

FIG. 2 is an illustration which shows the Transmission Control Protocol (TCP) header.

A DETAILED DESCRIPTION OF PREFERRED & ALTERNATIVE EMBODIMENTS

I. Overview of the Invention

The present invention provides methods for concealing the existence of a device connected to a computer network or concealing the existence of certain applications running on a device connected to a computer network. This concealment works by validating a TCP connection request in the first packet of the connection request transaction using a validation key embedded within the TCP connection request.

In one preferred embodiment of the invention, the validation is performed by the receiving host computer.

In another preferred embodiment, the validation is performed by an intervening network firewall.

In an alternate embodiment, the validation is performed by an attached network device.

In a preferred embodiment, the validation key is inserted by the network device requesting the TCP connection.

In another preferred embodiment, the validation key is inserted by an intervening network firewall.

In an alternate embodiment, the validation key is inserted by an attached network device.

II. Preferred and Alternative Embodiments

FIG. 1 generally illustrates an Internet Protocol (IP) header to which the present invention pertains as a Method for Concealing a Network Connected Device. Contained within the IP header are the Source Address (SA) field, the Destination Address (DA) field along with other data fields.

FIG. 2 generally illustrates a Transport Control Protocol (TCP) header to which the present invention pertains. Contained within the TCP header are the Source Port (SP) field, the Destination Port (DP) field, the Sequence Number (SEQ) field, the Acknowledgment Number (ACK) field along with other data fields.

Figure 3:
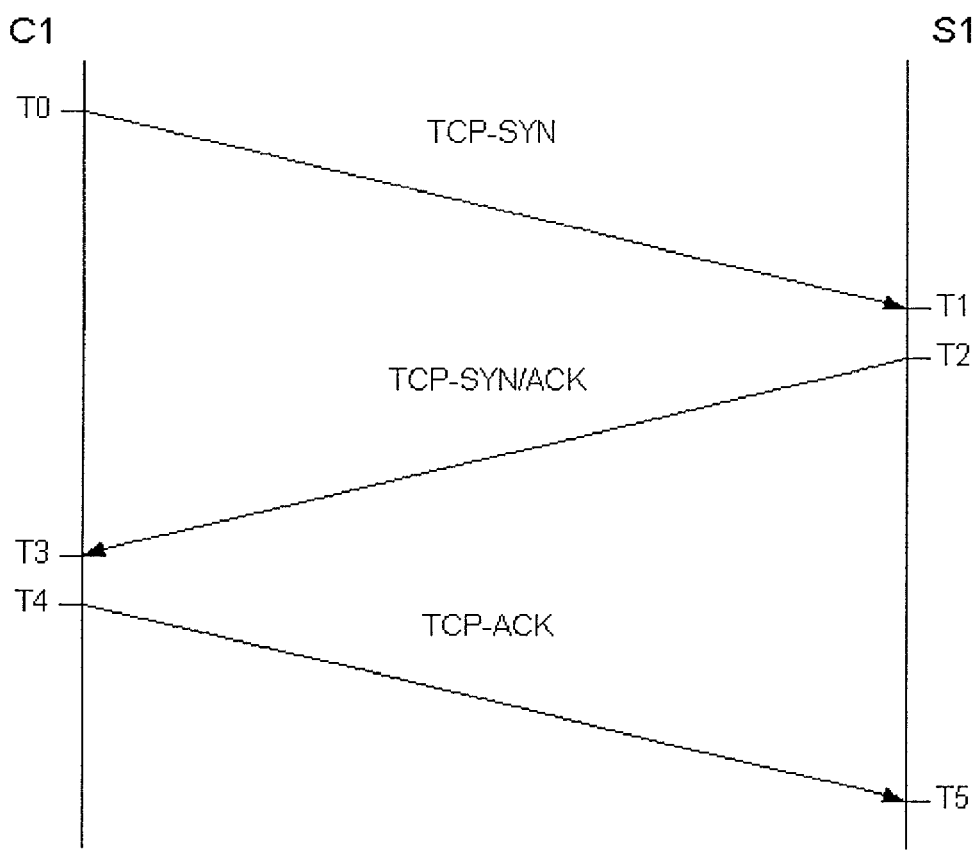
FIG. 3 is an illustration of the TCP/IP connection establishment transaction.

FIG. 3 generally illustrates a TCP connection establishment transaction. This transaction occurs between a TCP connection requestor C1 and a TCP connection grantor S1. Within this transaction are the TCP segments containing the connection request (TCP-SYN), the connection request acknowledgment (TCP-SYN/ACK) and the connection establishment acknowledgment (TCP-ACK). The TCP-SYN transaction component occurs in time from T0 to T1. The TCP-SYN/ACK transaction component occurs in time from T2 to T3. The TCP-ACK transaction component occurs in time from T4 to T5.

Figure 4:
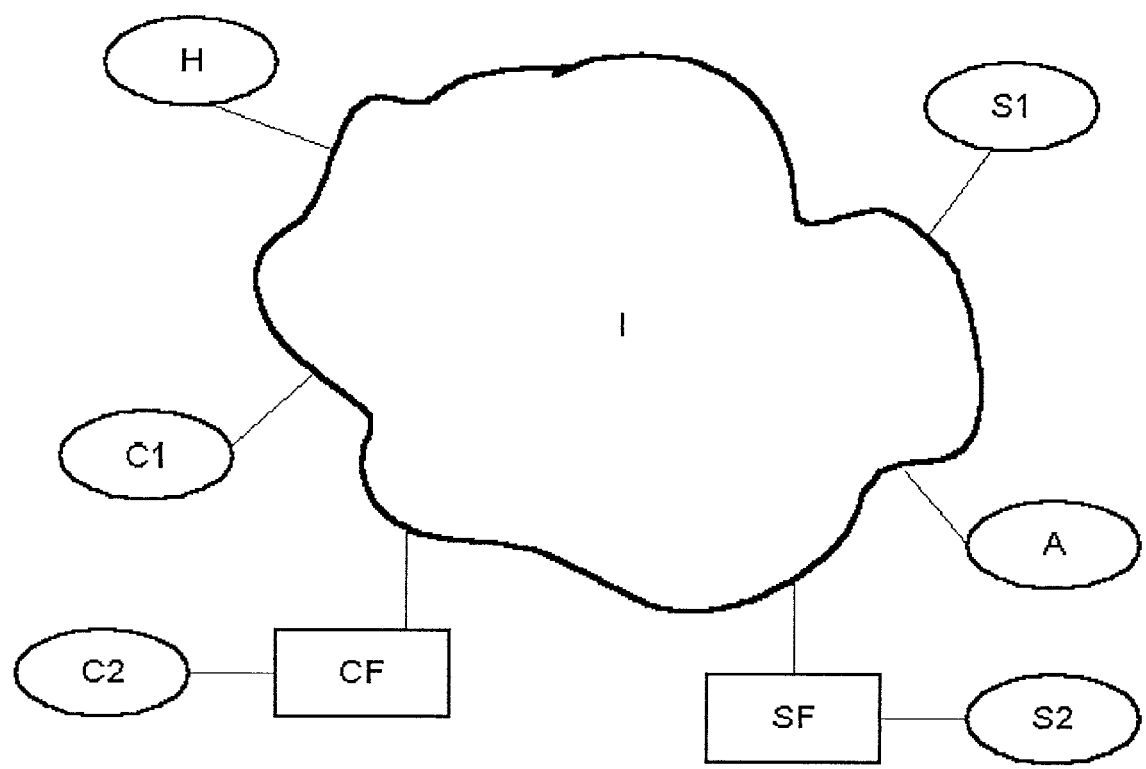
FIG. 4 is an illustration which shows the relationship between a network clients C1 and C2, a port scanner H, a client side network firewall CF, a network I, network servers S1 and S2, a server side network firewall SF and an authenticating network server A.

FIG. 4 generally illustrates the relationship between network clients C1 and C2, a port scanner H, a client side network firewall CF, a network I, network servers S1 and S2, a server side network firewall SF and an authenticating network server A.

In a preferred embodiment, network client C1 or C2 is capable of inserting an authentication key into the SEQ and ACK fields of a TCP header on a TCP connection request.

In a preferred embodiment, validating network server A is capable of extracting a validation key from the SEQ and ACK fields of a TCP header on received TCP connection request.

A network client C1 or C2 sends a TCP connection request to the validating network server A. Contained within the TCP connection request are the Sequence Number (SYN) and the Acknowledgment Number (ACK) fields in the TCP header which carry a validation key. When the validating network server A receives the TCP connection request from the network client C1 or C2, it extracts the validation key and uses it, along with other information about the requested connection such as the source address SA, the destination address DA, the destination port DP, the time and date the connection request was received and other data implicitly and explicitly carried by the TCP connection request to determine the validity of the connection request. In one preferred embodiment, when using a one time key as the validation key, the received validation key, along with the received time and data are the sole criteria used for validating the connection.

In another preferred embodiment, a client side network firewall CF is capable of inserting a validation key into the SEQ and ACK fields of a TCP header on a TCP connection request received from network client C2. Network client C2 is unable to insert the validation key. Placing any network client behind client side network firewall CF enables those TCP connection requests originating from them to be validated using this validation mechanism.

In another preferred embodiment, a server side network firewall SF is capable of extracting a validation key from the SEQ and ACK fields of a TCP header on received TCP connection request. The network server S2 behind the firewall is not capable of extracting the validation key. Placing any network server behind the server side network firewall SF enables all connections passing through SF to be validated without having to perform this validation on the network server.

In an alternate embodiment, the validation key may be inserted by any network device along the path between the network client and the device or network server performing the validation.

In an alternate embodiment, the validation key may be extracted by and network device along the path between the network server and the device or network client performing the insertion of the validation key.

III. Methods of Operation for Concealing a Network Connected Device

In FIG. 4, a port scanner H is attempting to probe validating network server A. Port scanner H does not have a validation key. Port scanner H sends a TCP connection request to validating network server A. Although port scanner H did not specifically insert a validation key into the SEQ and ACK fields of the TCP header, these fields are always present. Validating network server A extracts a key from the SEQ and ACK fields of the received TCP connection request.

If the validating network server A is using a one time key coupled with the received time and date as the validation criteria, there is a 1 in 2^64 chance that a randomly chosen SEQ and ACK number will match per expiration time of the one time key. The chance of choosing the correct value randomly is 1 in 18,446,744,073,709,551,616 per expiration time of the one time key. Thus it is highly unlikely that a random port scan will produce the correct validation key.

Because the TCP connection request did not contain a correct key, the connection request will be denied and no response will be returned to the port scanner H. The port scanner H, upon receiving no response from the validating network server A, will conclude that the server is not there. This demonstrates how a validating network server can be completely concealed from an unvalidated port scanner.

The novel use of the SEQ and ACK fields together as a 64 bit validation key allows a fairly strong validation while maintaining complete interoperability with known implementations of the TCP protocol.

A network client C sends a TCP connection request to the network server S1. Contained within the TCP connection request are the Sequence Number (SYN) and the Acknowledgment Number (ACK) fields in the TCP header which carry a validation key. When the network server S1 receives the TCP connection request from the network client C, it is unaware of the validation key embedded within the SEQ and ACK fields. It will allow connection establishment to all TCP ports without validating them. The network server S1 extracts the value of the SEQ field and uses it as the Initial Sequence Number as described in the TCP specification and sends back a TCP-SYN/ACK to continue the TCP connection establishment transaction. This demonstrates how the insertion of the validation key does not affect the operation or interoperability of network devices which are unaware of the presence of the embedded validation key.

IV. Apparatus for Concealing a Network Connected Device

In one preferred embodiment, the insertion of a validation key into the TCP header is performed in the TCP/IP protocol stack processing software on the network client.

In an alternate preferred embodiment, the insertion of a validation key into the TCP header is performed by a network protocol accelerator working alone or in conjunction with the protocol stack processing software on the client.

In an alternate preferred embodiment, the insertion of a validation key into the TCP header is performed by an encryption or authentication accelerator working alone or in conjunction with the protocol stack processing software on the client.

In an alternate preferred embodiment, the insertion of a validation key into the TCP header is performed by a network firewall placed between the client and the network.

In an alternate preferred embodiment, the insertion of a validation key into the TCP header is performed by a network device placed between the client and an validating device.

In one preferred embodiment, the extraction and validation of the validation key is performed in the TCP/IP protocol stack processing software on the network server.

In an alternate preferred embodiment, the extraction and validation of the a validation key is performed by a network protocol accelerator working alone or in conjunction with the protocol stack processing software on the client.

In an alternate preferred embodiment, the extraction and validation of the validation key is performed by an encryption or authentication accelerator working alone or in conjunction with the protocol stack processing software on the client.

In an alternate preferred embodiment, the extraction and validation of the validation key is performed by a network firewall placed between the server and the network.

In an alternate preferred embodiment, the extraction and validation of the validation key is performed by a network device placed between the server and a validation key insertion device.

CONCLUSION

Although the present invention has been described in detail with reference to one or more preferred embodiments, persons possessing ordinary skill in the art to which this invention pertains will appreciate that various modifications and enhancements may be made without departing from the spirit and scope of the claims that follow. The various alternatives for providing an efficient means for concealing a network connected device that have been disclosed above are intended to educate the reader about preferred embodiments of the invention, and are not intended to constrain the limits of the invention or the scope of claims. The List of Reference Characters which follows is intended to provide the reader with a convenient means of identifying elements of the invention in the Specification and Drawings. This list is not intended to delineate or narrow the scope of the claims.

LIST OF REFERENCE CHARACTERS

SA IP Source Address
DA IP Destination Address
SP TCP Source Port
DP TCP Destination Port
SEQ TCP Sequence Number
ACK TCP Acknowledgement Number
TCP-SYN TCP Connection Request
TCP-SYN/ACK TCP Connection Request Acknowledgement
TCP-ACK TCP Connection Establishment Acknowledgement
T0–T5 Points in time
C1, C2 Network Clients
S1, S2 Network Servers
CF Client Side Network Firewall
SF Server Side Network Firewall
H Internet Port Scanner
A Validating Network Server
I Network

What is claimed is:

1. A method comprising the steps of:
    receiving a TCP connection request on a TCP port to which a network application has been bound on a network server;
    extracting a validation key from a SEQ and an ACK field of said TCP connection request;
    validating said TCP connection request based on said extracted validation key and other data contained within said TCP connection request;
    determining that said extracted validation key is invalid for said TCP connection request;
    discarding said TCP connection request and sending no reply back to a sender of said TCP connection request to conceal said network server from an unvalidated, unauthorized network client.

* * * * *